US008305001B2

(12) United States Patent
Horiuchi et al.

(10) Patent No.: US 8,305,001 B2
(45) Date of Patent: Nov. 6, 2012

(54) LIGHT-EMITTING DIODE DRIVER CIRCUIT AND LIGHTING APPARATUS

(75) Inventors: Fumio Horiuchi, Ashikaga (JP); Toru Imaizumi, Ota (JP); Takaya Kusabe, Ota (JP)

(73) Assignees: Semiconductor Components Industries, LLC, Phoenix, AZ (US); Sanyo Semiconductor Co., Ltd., Gunma (JP)

( * ) Notice: Subject to any disclaimer, the term of this patent is extended or adjusted under 35 U.S.C. 154(b) by 195 days.

(21) Appl. No.: 12/840,975

(22) Filed: Jul. 21, 2010

(65) Prior Publication Data

US 2011/0025225 A1 Feb. 3, 2011

(30) Foreign Application Priority Data

Jul. 31, 2009 (JP) ................................. 2009-178973

(51) Int. Cl.
*H05B 37/02* (2006.01)
*H02M 3/335* (2006.01)

(52) U.S. Cl. ..... 315/219; 315/232; 315/254; 315/200 R; 363/21.18; 363/21.01; 363/49; 363/16

(58) Field of Classification Search ............... 363/21.01, 363/21.04, 21.08, 21.11, 21.12, 20, 74, 97, 363/131; 307/31, 38, 39, 58, 75, 82–84; 315/246, 291, 307, 308
See application file for complete search history.

(56) References Cited

U.S. PATENT DOCUMENTS

| | | | | |
|---|---|---|---|---|
| 5,978,235 | A * | 11/1999 | Lampinen | 363/21.16 |
| 6,597,588 | B2 * | 7/2003 | Matsumoto | 363/21.08 |
| 7,245,087 | B2 * | 7/2007 | Nishikawa et al. | 315/224 |
| 7,522,429 | B2 * | 4/2009 | Usui | 363/16 |
| 2007/0097715 | A1 * | 5/2007 | Choi | 363/24 |
| 2008/0117653 | A1 * | 5/2008 | Saito | 363/20 |
| 2008/0259659 | A1 * | 10/2008 | Choi et al. | 363/50 |

FOREIGN PATENT DOCUMENTS

JP 2009-134945 6/2009

* cited by examiner

*Primary Examiner* — Vibol Tan
(74) *Attorney, Agent, or Firm* — SoCal IP Law Group LLP; Steven C. Sereboff; John E. Gunther

(57) ABSTRACT

A light-emitting diode driver circuit includes: a first-rectifier circuit to output a first-rectified voltage; a transformer including primary and secondary coils and an auxiliary coil inductively coupled to the primary or secondary coils, the primary coil being applied with the first-rectified voltage; a transistor connected in series to the primary coil; a second-rectifier circuit to output a second-rectified voltage obtained by rectifying a voltage generated in the auxiliary coil; a capacitor to be charged with the second-rectified voltage; and a control circuit to control on and off of the transistor based on a charging voltage of the capacitor so that the charging voltage becomes equal to a predetermined voltage, the secondary coil outputting a voltage that varies with a frequency corresponding to a frequency of the first-rectified voltage and that corresponds to a turns ratio between the primary and secondary coils, as a voltage for driving a light-emitting diode.

5 Claims, 6 Drawing Sheets

LIGHT-EMITTING DIODE DRIVER CIRCUIT AND LIGHTING APPARATUS

CROSS-REFERENCE TO RELATED APPLICATION

This application claims the benefit of priority to Japanese Patent Application No. 2009-178973, filed Jul. 31, 2009, of which full contents are incorporated herein by reference.

BACKGROUND OF THE INVENTION

1. Field of the Invention

The present invention relates to a light-emitting diode driver circuit and a lighting apparatus.

2. Description of the Related Art

A certain type of a lighting apparatus employing a light-emitting diode (hereinafter, referred to as "LED") is turned on with a power voltage from a commercial power supply. Generally, in such a lighting apparatus, a DC voltage for driving the LED is generated out of an AC voltage from the commercial power supply, using an AC-DC converter (see Japanese Patent Application Laid-Open Publication No. 2009-134945). FIG. 8 depicts a common configuration of an AC-DC converter. An AC-DC converter 100 is a circuit that generates a desired DC output voltage Vout out of an AC voltage Vac from a commercial power supply and drives an LED 300. The AC-DC converter 100 includes a full-wave rectifier circuit 200, capacitors 201 to 203, a resistor 204, a control circuit 205, a power MOSFET 206, diodes 207 and 208, a transformer 209, and a voltage detecting circuit 210.

When the AC-DC converter 100 is supplied with the AC voltage Vac, the full-wave rectifier circuit 200 full-wave rectifies the input AC voltage Vac to and outputs the rectified voltage Vac. The capacitor 201 smoothes a voltage output from the full-wave rectifier circuit 200 into an input voltage Vin. The capacitor 202 is charged with the smoothed input voltage Vin via the resistor 204 for starting the control circuit 205. The control circuit 205 uses a charging voltage of the capacitor 202 as a source voltage. Thus, the control circuit 205 starts up when the capacitor 202 is charged, and starts switching control over the power MOSFET 206. When switching control over the power MOSFET 206 is started, a voltage is generated across a primary coil L1 of the transformer 209, and as a result in response to a voltage change across the primary coil L1, a voltage is generated across each of a secondary coil L2 and an auxiliary coil L3 of the transformer 209. A current generated by the auxiliary coil L3 of the transformer 209 is rectified by the diode 207, to be supplied to the capacitor 202. Therefore, after the start of the control circuit 205, the source voltage of the control circuit 205 is secured in a stable manner with a voltage from the auxiliary coil L3 of the transformer 209 through the diode 207.

The diode 208 and the capacitor 203 rectify and smooth a voltage from the secondary coil L2 of the transformer 209. Thus, a DC charging voltage is generated across the capacitor 203. The voltage detecting circuit 210 compares the output voltage Vout, which is the charging voltage of the capacitor 203, with a desired voltage. When the output voltage Vout is higher than the desired voltage, the voltage detecting circuit 210 allows the control circuit 205 to extend a time period during which the power MOSFET 206 is off. On the other hand, when the output voltage Vout is lower than the desired voltage, the voltage detecting circuit 210 allows the control circuit 205 to extend a time period during which the power MOSFET 206 is on.

Therefore, in the AC-DC converter 100, the output voltage Vout becomes the desired voltage, and the desired voltage is applied to the LED 300.

The AC voltage Vac has a frequency of 50 Hz, for example, and thus an electrolytic capacitor having a large capacitance is used as the capacitor 201 which smoothes a full-wave rectified voltage. In the AC-DC converter 100, even if a current, etc., passing through the LED 300 transitionally vary, an electrolytic capacitor having a large capacitance is also used as the capacitor 203 so that the fluctuation in the output voltage Vout is suppressed. As such, an electrolytic capacitor having a life shorter than that of a ceramic capacitor, etc., is used in the AC-DC converter 100, which causes such a problem that maintaining the life of the AC-DC converter 100 longer than that of the electrolytic capacitor is difficult.

SUMMARY OF THE INVENTION

A light-emitting diode driver circuit according to an aspect of the present invention, comprises: a first rectifier circuit configured to output a first rectified voltage obtained by rectifying an AC voltage; a transformer including a primary coil provided on a primary side, a secondary coil provided on a secondary side, and an auxiliary coil inductively coupled to the primary coil or the secondary coil, the primary coil configured to be applied with the first rectified voltage; a transistor connected in series to the primary coil to control a current passing through the primary coil; a second rectifier circuit configured to output a second rectified voltage obtained by rectifying a voltage generated in the auxiliary coil; a capacitor configured to be charged with the second rectified voltage; and a control circuit configured to control on and off of the transistor based on a charging voltage of the capacitor so that the charging voltage becomes equal to a predetermined voltage, the secondary coil outputting a voltage that varies with a frequency corresponding to a frequency of the first rectified voltage and that corresponds to a turns ratio between the primary coil and the secondary coil, as a voltage for driving a light-emitting diode.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

Figure 1:
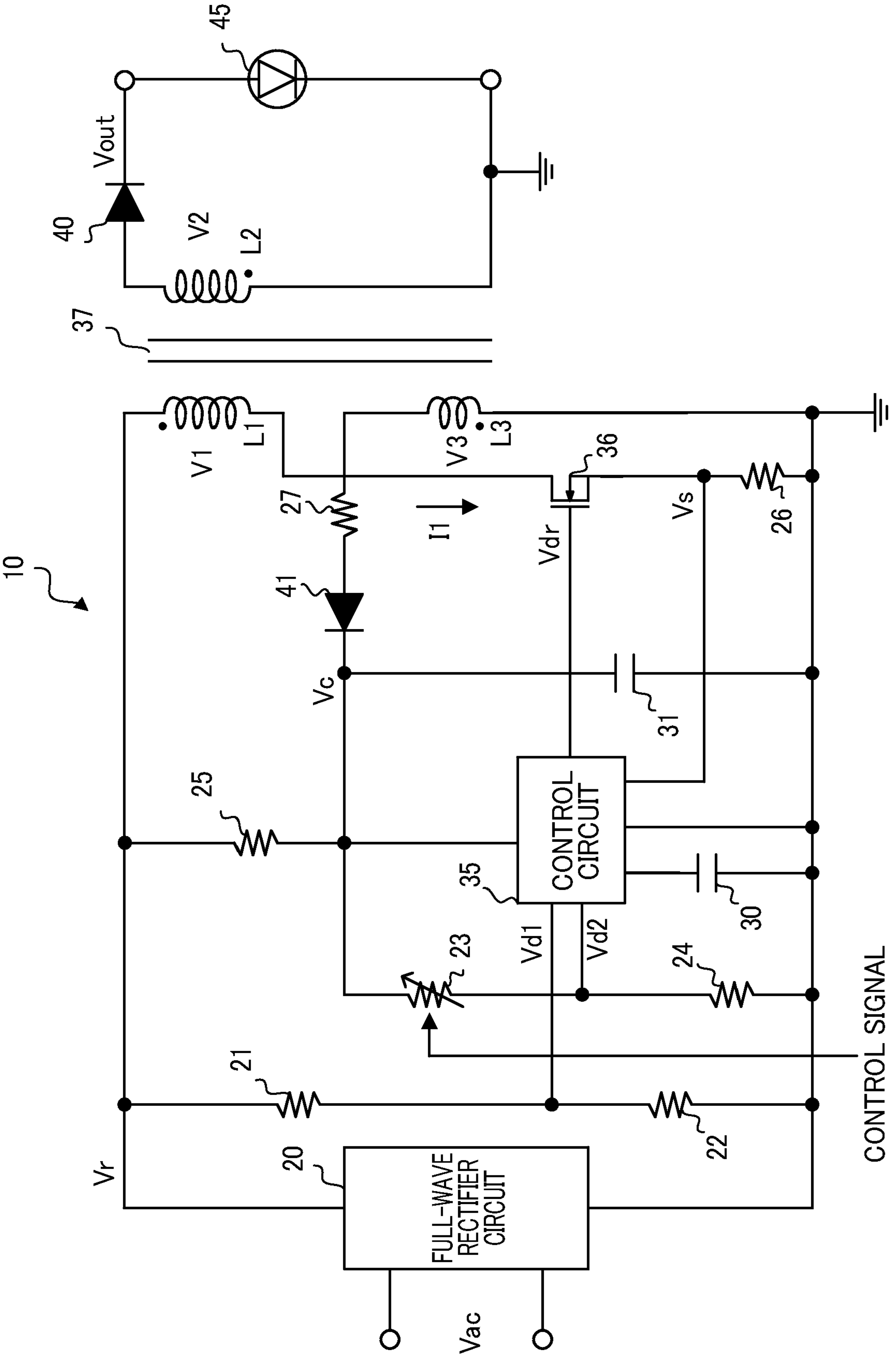
FIG. 1 depicts a configuration of an LED driver circuit 10 according to an embodiment of the present invention.

FIG. 1 depicts a configuration of an LED driver circuit 10 according to an embodiment of the present invention. The LED driver circuit 10 is a circuit configured to generate an output voltage Vout for driving an LED 45 out of an AC voltage Vac from a commercial power supply. The LED driver circuit 10 includes a full-wave rectifier circuit 20, resistors 21 to 27, capacitors 30 and 31, a control circuit 35, a power MOSFET 36, a transformer 37, and diodes 40 and 41. The full-wave rectifier circuit 20 (first rectifier circuit) full-wave rectifies the input AC voltage Vac, to output a rectified voltage Vr.

The resistors 21 and 22 output to the control circuit 35 a divided voltage Vd1 obtained by dividing the rectified voltage Vr, and resistors 23 and 24 output to the control circuit 35 a divided voltage Vd2 obtained by dividing a charging voltage Vc of the capacitor 31. The resistor 23 is a variable resistor whose resistance value varies according to a control signal input thereto. The resistors 23 and 24 correspond to a voltage-dividing circuit.

The resistor 25 is a starting resistor for causing the control circuit 35 to start, and the resistor 26 (current detecting circuit) is a detecting resistor for detecting a current passing through the power MOSFET 36. A voltage at a node at which the resistor 26 and the power MOSFET 36 are connected is referred to as detection voltage Vs.

The resistor 27 is a noise elimination resistor for keeping the charging voltage Vc stable.

The capacitor 30 is a phase compensation capacitor that allows the control circuit 35 to operate steadily. The capacitor 31 has one end connected to the resistors 23 and 25 and to the cathode of the diode 41. The capacitor 31, therefore, is charged with a current from the diode 41. The charging voltage Vc of the capacitor 31 is used as a source voltage for the control circuit 35. The capacitors 30 and 31 are provided as ceramic capacitors, for example.

The control circuit 35 is a circuit configured to control on and off of the power MOSFET 36 based on the divided voltages Vd1 and Vd2 and the detection voltage Vs. The control circuit 35 also serves as a power factor correction circuit that causes a value of a current I1 passing through a primary coil L1, which will be described later, to change according to a level of the rectified voltage Vr. The control circuit 35 according to an embodiment of the present invention is a so-called current mode PWM (Pulse Width Modulation) controller, and switches the power MOSFET 36 on and off with a drive signal Vdr modulated by PWM. It is assumed that the drive signal Vdr has a period sufficiently shorter than that of the AC voltage Vac. The control circuit 35 according to an embodiment of the present invention is an integrated circuit, though terminals, etc., therein are not depicted. The control circuit 35 will be described later in detail.

The power MOSFET 36 (transistor) is an N-channel MOSFET configured to be turned on when the high-level drive signal Vdr is output from the control circuit 35 thereto and to be turned off when the low-level drive signal Vdr is output from the control circuit 35 thereto.

The transformer 37 includes the primary coil L1, a secondary coil L2, and an auxiliary coil L3, and the primary coil L1 and the auxiliary coil L3 are insulated from the secondary coil L2. In the transformer 37, voltages V2 and V3 are generated across the secondary coil L2 and the auxiliary coil L3, respectively, according to a change in a voltage V1 across the primary coil L1. The primary coil L1 according to an embodiment of the present invention has one end applied with the rectified voltage Vr and the other end connected to the drain electrode of the power MOSFET 36. Therefore, when switching control over the power MOSFET 36 is started, the voltage V2 of the secondary coil L2 and the voltage V3 of the auxiliary coil L3 are changed. In an embodiment of the present invention, the numbers of turns of the primary coil L1, the secondary coil L2, and the auxiliary coil L3 are referred to as N1, N2, and N3, respectively. The primary coil L1 is inductively coupled to the secondary coil L2 in reverse polarity, while the secondary coil is inductively coupled to the auxiliary coil L3 in the same polarity.

The diode 40 outputs to the LED 45 the voltage Vout obtained by rectifying the voltage V2 of the secondary coil L2 of the transformer 37.

The diode 41 (second rectifier circuit) rectifies the voltage V3 of the auxiliary coil L3 of the transformer 37 to output the rectified voltage to the capacitor 31. Thus, in an embodiment of the present invention, once switching control over the power MOSFET 36 is started, the capacitor 31 is charged principally with a current from the diode 41.

Figure 2:
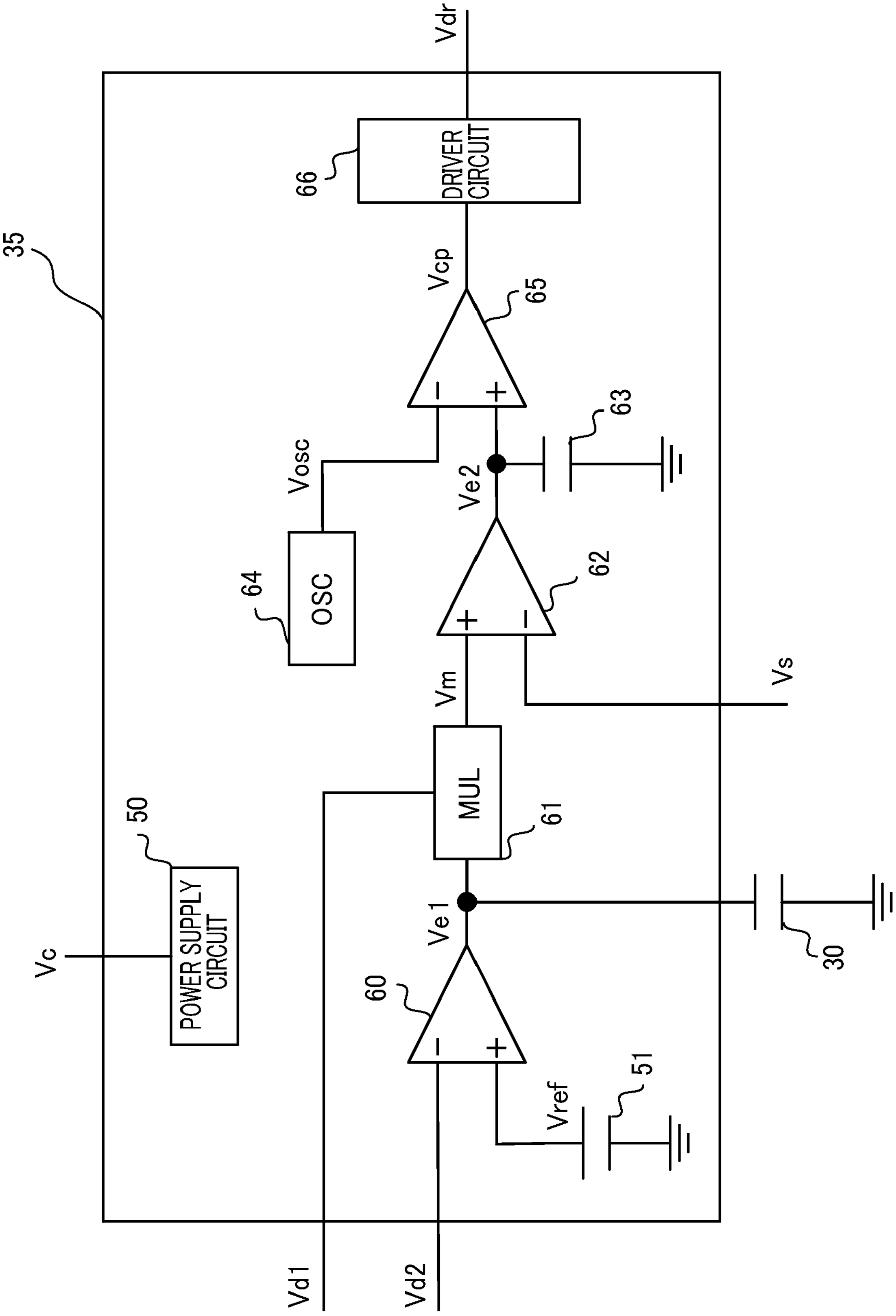
FIG. 2 depicts an example of a control circuit 35.

An example of the control circuit 35 will be described with reference to FIG. 2. The control circuit 35 includes a power supply circuit 50, a reference voltage circuit 51, error amplifier circuits 60 and 62, a multiplier circuit (MUL) 61, a capacitor 63, an oscillator circuit (OSC) 64, a comparator 65, and a driver circuit 66.

The power supply circuit 50 generates, based on the charging voltage Vc, a power supply voltage with which the above described circuits included in the control circuit 35 operate. The reference voltage circuit 51 generates a predetermined reference voltage Vref.

The error amplifier circuit 60 outputs to the multiplier circuit 61*a* voltage corresponding to an error between the divided voltage Vd2 and the reference voltage Vref. The capacitor 30 is a phase compensation capacitor that allows the error amplifier circuit 60 to operate stably. In an embodiment of the present invention, an output voltage from the error amplifier circuit 60 is referred to as voltage Ve1.

The multiplier circuit 61 multiplies the divided voltage Vd1 and the voltage Ve1 together, and outputs the result of such multiplication as a voltage Vm.

The error amplifier circuit 62 charges and discharges the capacitor 63 in accordance with an error between the voltage Vm and the detection voltage Vs. In an embodiment of the present invention, the error amplifier circuit 62 is the same as the error amplifier circuit 60, and an output voltage from the error amplifier circuit 62 is referred to as voltage Ve2. The capacitor 63 is a phase compensation capacitor similar to the capacitor 30, and is made of polysilicon, etc., for example.

The oscillator circuit 64 outputs an oscillation signal Vosc of a triangular wave having a predetermined period. The comparator 65 compares the oscillation signal Vosc with the voltage Ve2, to output such comparison result as a voltage Vcp.

When the voltage Vcp goes high, the driver circuit 66 allows the driving signal Vdr to go high, so that the power MOSFET 36 is turned on. On the other hand, when the voltage Vcp goes low, the driver circuit 66 allows the driving signal Vdr to go low, so that the power MOSFET is turned off.

A description will be given of an operation of the control circuit 35 when the control circuit 35 causes a value of the current I1 passing through the primary coil L1 to change according to a level of the rectified voltage Vr, with reference to FIGS. 3 and 4. Here, it is assumed that the charging voltage Vc is not changed.

Since the charging voltage Vc remains constant, the divided voltage Vd2 also remains constant. As a result, the voltage Ve1 becomes a constant DC voltage. The voltage Vm, which is the product of the voltage Ve1 and the divided voltage Vd1 obtained by dividing the rectified voltage Vr in a half period of the AC voltage Vac, has a waveform depicted in FIG. 3, for example.

Here, when the detection voltage Vs is lower than the voltage Vm, for example, the voltage Ve2 is increased. As the voltage Ve2 is increased, a period during which the drive signal Vdr is high becomes longer, as is obvious from FIG. 4. As a result, a period during which the power MOSFET 36 is on becomes longer, and thus, the current I1 is increased. In one period of the drive signal Vdr, the period during which the power MOSFET 36 is on is referred to as Ton and a period during which the power MOSFET 36 is off is referred to as Toff. The detection voltage Vs is determined by the product of a value of the current I1 and a value of the resistor 26. Therefore, an increase in the current I1 results in an increase in the detection voltage Vs.

On the other hand, when the detection voltage Vs is higher than the voltage Vm, for example, the voltage Ve2 is decreased. As the voltage Ve2 is decreased, the period in which the drive signal Vdr is high becomes shorter, as is obvious from FIG. 4. As a result, the period during which the power MOSFET 36 is on becomes shorter, and thus, the current I1 is decreased. Therefore, the detection voltage Vs is decreased. As such, the control circuit 35 drives the power MOSFET 36 so that the detection voltage Vs becomes equal to the voltage Vm. Consequently, the current I1 varies according to a level of the rectified voltage Vr.

[Operation of LED Driver Circuit 10]

An operation of the LED driver circuit 10 will be described. Here, it is assumed that the resistor 23 is set to have a predetermined resistance value.

Figure 5:
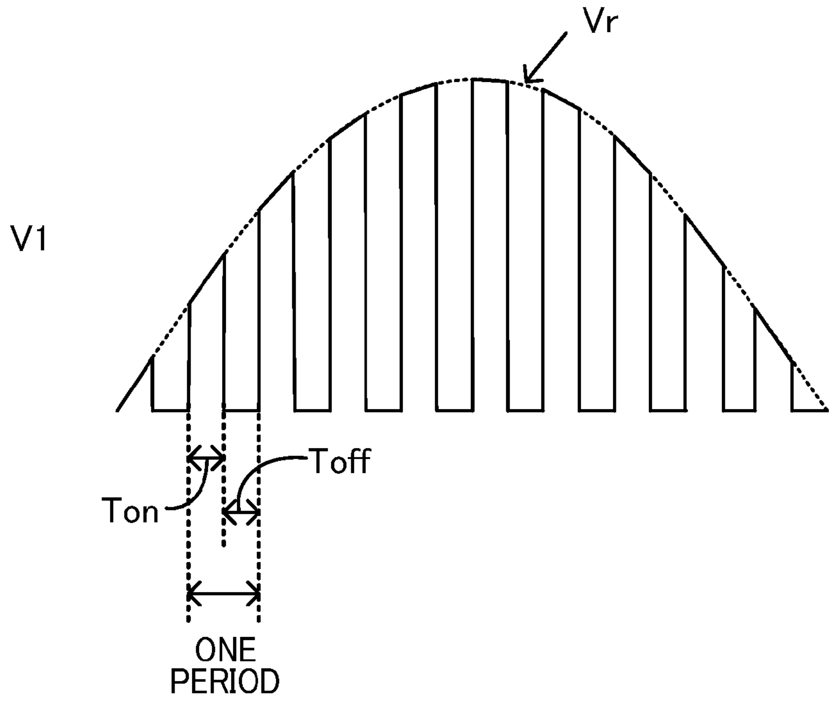
FIG. 5 depicts an example of a waveform of a voltage V1.

When the LED driver circuit 10 is supplied with a power supply voltage from the commercial power supply, i.e., it is applied with the AC voltage Vac, the capacitor 31 is charged with the rectified voltage Vr through the resistor 25. When the charging voltage Vc is increased, the control circuit 35 is started, and the circuits included in the control circuit 35 are operated. Here, the reference voltage Vref is set higher than the divided voltage Vd2 obtained by dividing the charging voltage Vc at the startup of the control circuit 35. Thus, the voltage Ve1 is increased, to increase the voltage Vm in DC level. As a result, the voltage Ve2 is also increased, which causes the drive circuit 66 to start switching on and off the power MOSFET 36 with the drive signal Vdr having the longer on period Ton. When the power MOSFET 36 is turned on, the voltage V1 becomes the rectified voltage Vr. When the power MOSFET 36 is turned off, the voltage V1 becomes zero. The voltage V1, therefore, varies in the same manner as the rectified voltage Vr does, having a waveform depicted in FIG. 5, for example.

The primary coil L1 is inductively coupled to the secondary coil L2 in reverse polarity. Thus, energy is stored in the primary coil L1 when the power MOSFET 36 is turned on, and energy stored in the primary coil L1 is released from the secondary coil L2 when the power MOSFET 36 is turned off.

Here, for example, the average voltage Vav1 of the voltage V2 in one period of the rectified voltage Vr (a half period of the AC voltage Vac) is given by the following equation (1):

$$Vav1 \propto Vrp \times (Ton^2/(Ton+Toff)) \times (N2/N1) \quad (1)$$

where Vrp is a peak voltage of the rectified voltage Vr.

Thus, the average voltage Vav1 is increased as the on period of the power MOSFET 36 becomes longer.

The average voltage Vav1 and the average voltage Vav2 of the voltage V3 in one period of the rectified voltage Vr have the following relationship.

$$Vav2 = Vav1 \times (N3/N2) \quad (2)$$

Hence the average voltage Vav2 is expressed by the following equation (3).

$$Vav2 \propto Vrp \times (Ton^2/(Ton+Toff)) \times (N3/N1) \quad (3)$$

As obvious from the equation (3), the average voltage Vav2 of the voltage V3 is increased as the on period of the power MOSFET 36 becomes longer. The voltage V3 is rectified by the diode 41, and then is applied to the capacitor 31. Therefore, the greater the average voltage Vav2 of the voltage V3 is, a level of the higher the charging voltage Vc is.

As described above, when the control circuit 35 is started, the on period Ton of the power MOSFET 36 becomes longer, and thus, the average voltage Vav2 is increased. Therefore, the charging voltage Vc and the divided voltage Vd2 are also increased, so that the divided voltage Vd2 gradually approaches the reference voltage Vref. If the divided voltage Vd2 becomes higher than the reference voltage Vref, the voltage Ve1 is decreased. In such case, the voltage Vm is decreased in DC level, which causes the voltage Ve2 to be decreased, and the on-period of the power MOSFET 36 becomes shorter. Thus, in an embodiment of the present invention, the power MOSFET 36 is controlled such that the divided voltage Vd2 is kept equal to the reference voltage Vref. In an embodiment of the present invention, assuming that a value of the voltage-dividing resistor 23 is R1 and a value of the resistor 24 is R2, the divided voltage Vd2 is expressed by an equation: $Vd2=(R2/(R1+R2))\times Vc$. Thus, when the divided voltage Vd2 is equal to the reference voltage Vref, The equation is expressed by $Vc=((R1+R2)/R2)\times Vref$.

The control circuit 35 controls the power MOSFET 36 based on the divided voltage Vd2 and the above-described detection voltage Vs. The divided voltage Vd2 is fed back to the error amplifier circuit 60, and the detection voltage Vs is fed back to the error amplifier circuit 62 subjected to the influence of the voltage Ve1 output from the error amplifier circuit 60. A feedback loop of the detection voltage Vs is thus created in a feedback loop of the divided voltage Vd2. In such a configuration, the feedback loop of the divided voltage Vd2 corresponds to a major loop for controlling the charging voltage Vc, while the feedback loop of the detection voltage Vs corresponds to a minor loop for controlling the current I1. Because of this, the on period Ton of the power MOSFET 36 varies according to the rectified voltage Vr, however, the power MOSFET 36 is controlled such that the divided voltage Vd2 is kept equal to the reference voltage Vref during one period of the rectified voltage Vr, for example. That is, when the divided voltage Vd2 is equal to the reference voltage Vref, the period during which the power MOSFET 36 is on in one period of the rectified voltage Vr becomes constant.

Figure 6:
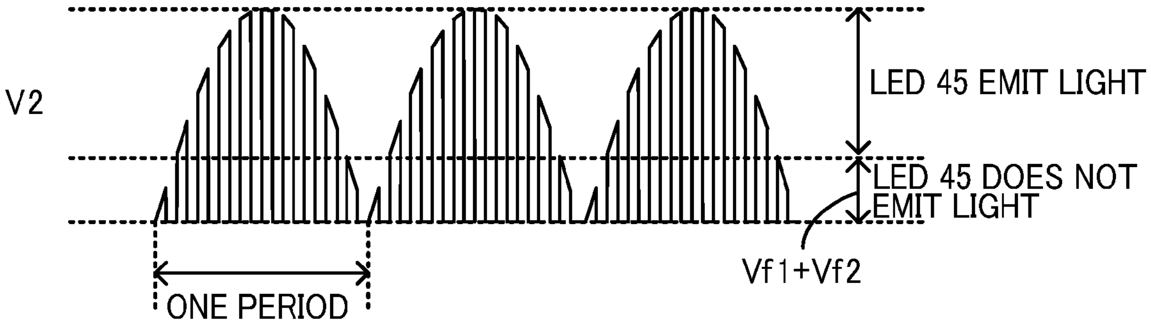
FIG. 6 depicts an example of waveforms of a voltage V2 and an output voltage Vout.

A description will then be given of the voltage V2 when the divided voltage Vd2 is equal to the reference voltage Vref. Since the primary coil L1 is inductively coupled to the secondary coil L2, the voltage V2 has a waveform depicted in FIG. 6, for example. In FIG. 6, the voltage V2 varies according to $(Vr\times(N2/N1))$, i.e., the product of a level of the rectified voltage Vr and a turns ratio N2/N1. When the divided voltage Vd2 is equal to the reference voltage Vref, a value of $Ton^2/(Ton+Toff)$ is constant, and thus the average voltage Vav1 of the voltage V2 is also constant. Therefore, in one period of the rectified voltage Vr, a period in which the voltage V2 is equal to $(Vr\times(N2/N1))$, that is, each period indicated by solid lines with respect to the V2 in FIG. 6, is constant. In FIG. 6, timing of the voltage V2 becoming equal to $(Vr\times(N2/N1))$ is determined based on a switching frequency of the power MOSFET 36.

The voltage V2 is applied to the diode 40 and the LED 45. Thus, when the voltage V2 becomes greater in level than the sum of a forward voltage Vf1 of the diode 40 and a forward voltage Vf2 of the LED 45, the LED 45 emits light in accordance with a level of the voltage V2. In this case, the output voltage Vout is expressed by Vout=V2−Vf1. As such, according to an embodiment of the present invention, the voltage V2, whose average voltage Vav1 is constant and which periodically changes, can be applied to the LED 45. Therefore, the LED 45 is supplied with an identical current every time the period of the voltage V2 is repeated, thereby emitting light in a stable manner.

[LED Lighting Apparatus 70]

Figure 7:
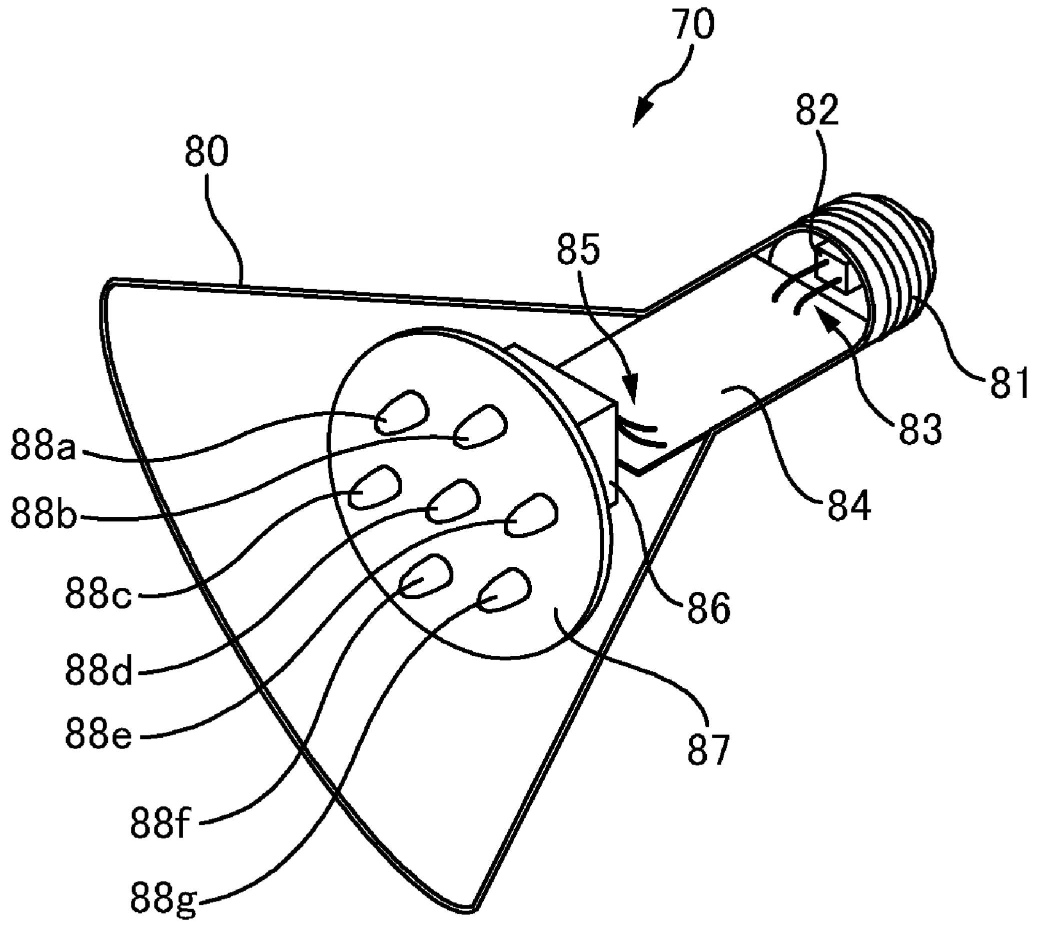
FIG. 7 is a sectional view of an LED lighting apparatus 70.
Figure 8:
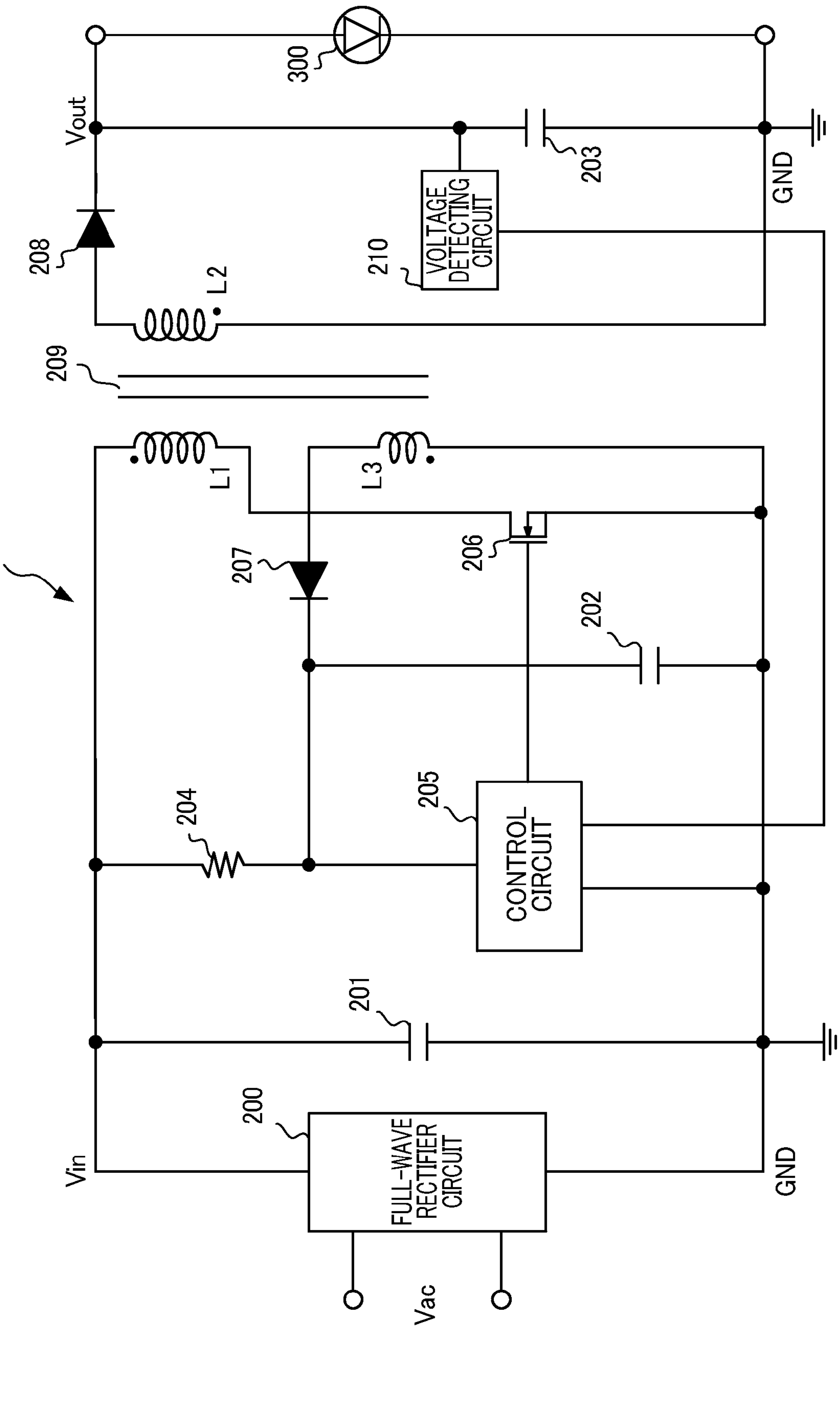
FIG. 8 depicts a configuration of a common AC-DC converter 100.

FIG. 7 is a sectional view illustrating a configuration of an LED lighting apparatus 70 using the LED driver circuit 10. The LED lighting apparatus 70 includes an enclosure 80, a base portion 81, connecting portion 82 to 86, wirings 83 and 85, a board 84, an LED mounting unit 87, and LEDs 88*a* to 88*g*.

The base portion 81 is connected to a household commercial power supply socket, etc., and is supplied with a power supply voltage from a commercial power supply. The connecting portion 82 outputs, to the wiring 83, a power supply voltage output from the commercial power supply to the base portion 81. The LED driver circuit 10 is mounted on the board 84 provided inside the enclosure 80, and the AC voltage Vac is applied to the full-wave rectifier circuit 20 of the LED driver circuit 10 via the wiring 83. The output voltage Vout from the LED driver circuit 10 and a ground voltage GND are applied to one terminal (not depicted) and the other terminal (not depicted) of the connecting portion 86 via the wiring 85, respectively. The LED mounting unit 87 disposed on an opening of the enclosure 80 is connected in series to seven LEDs 88*a* to 88*g*. One terminal of the connecting portion 86 is connected to the anode of the LED 88*a*, while the other terminal of the connecting portion 86 is connected to the cathode of the LED 88*g*. Thus, when the LED lighting apparatus 70 is inserted into the commercial power socket, the LED driver circuit 10 operates to drive the LEDs 88*a* to 88*g* with a voltage having such a waveform as depicted in FIG. 6, for example.

The LED driver circuit 10 according to an embodiment of the present invention has been described. In an embodiment of the present invention, the on period Ton and the off period Toff of the power MOSFET 36 are determined such that the charging voltage Vc of the capacitor 31 is set at the predetermined voltage Vc=((R1+R2)/R2)×Vref. When the charging voltage Vc is constant, the average voltage Vav1 of the secondary coil voltage V2 is also constant. Thus, the LED driver circuit 10 can apply to the LED 45 the voltage V2 whose average voltage Vav1 is constant and which varies according to the frequency of the rectified voltage Vr. Therefore, the LED 45 is supplied with the identical current every one period of the voltage V2. As a result, the LED driver circuit 10 is able to cause the LED 45 to emit light stably without using an electrolytic capacitor having a large capacitance. Further, since an electrolytic capacitor is not required to be used, the LED driver circuit 10 can be given a longer life.

The LED driver circuit 10 full-wave rectifies the AC voltage Vac by the full-wave rectifier circuit 20, to generate the rectified voltage Vr. For example, if a half-wave rectifier circuit is used in place of the full-wave rectifier circuit 20, a time period during which the LED 45 emits light becomes half of the time period in the case where the full-wave rectifier circuit 20 is used. Therefore, in an embodiment according to the present invention, the LED 45 can be allowed to emit light with flickering being more reduced.

Figure 3:
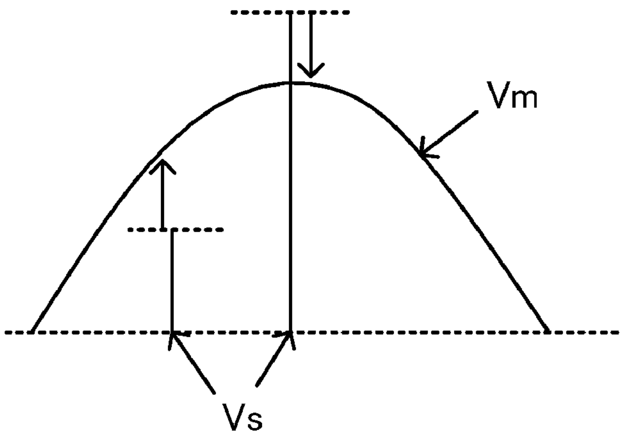
FIG. 3 depicts a relationship between a detection voltage Vs and a voltage Vm.
Figure 4:
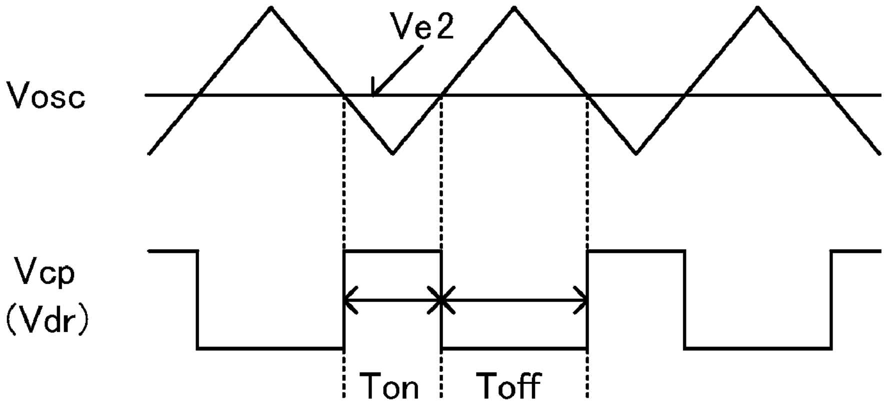
FIG. 4 is an explanatory diagram of a change in a drive signal Vdr.

The LED driver circuit 10 causes the waveform of the current I1 passing through the power MOSFET 36 to vary according to the rectified voltage Vr as depicted in FIG. 3. Therefore, the voltage V1 applied to the primary coil L1 becomes similar in waveform to the current I1, and thus, a power factor is improved.

In an embodiment of the present invention, a value of the resistor 23 can be varied with a control signal. For example, if a value of the resistor 23 is reduced to be smaller than a predetermined value, the charging voltage Vc is decreased for Vc=((R1+R2)/R2)×Vref. Therefore, in this case, the power MOSFET 36 is controlled such that the on period Ton of the power MOSFET 36 becomes shorter. When the on period Ton becomes shorter, the average voltage Vav1 of the voltage V2 is decreased, and as a result, the luminance of the LED 45 is decreased. In contrast, if a value of the resistor 23 is increased to be greater than the predetermined value, the luminance of the LED 45 is increased. Thus, the LED driver circuit 10 according to an embodiment of the present invention is capable of adjusting the luminance of the LED 45.

Further, the LED driver circuit 10 not including an electrolytic capacitor can be employed in the LED lighting apparatus 70, as depicted in FIG. 7. Therefore, the LED lighting apparatus 70 with less flickering and a longer life can be realized.

The above embodiments of the present invention are simply for facilitating the understanding of the present invention and are not in anyway to be construed as limiting the present invention. The present invention may variously be changed or altered without departing from its spirit and encompass equivalents thereof.

In an embodiment of the present invention, the voltage V2 is rectified by the diode 40, to generate the voltage Vout, and the voltage Vout is applied to the LED 45, however, it is not limited thereto. For example, the diode 40 may not be provided and the LED 45 may be directly connected to the secondary coil L2. Even in such a case, an electrolytic capacitor is not required to be provided. Thus, the life of the LED driver circuit 10 can be extended with flickering in the LED 45 being suppressed.

The AC voltage Vac from the commercial power supply is applied to the LED driver circuit 10 in an embodiment of the present invention, however, an AC voltage converted by an inverter, etc., to have a high frequency may be applied, for example. In such a case, the LED 45 is able to emit light stably, even if a half-wave rectifier circuit is employed in place of the full-wave rectifier circuit 20.

In an embodiment of the present invention, no capacitor is provided at an output end of the full-wave rectifier circuit 20 and at both ends of the secondary coil L2. However, in order to suppress radiation noise, etc., ceramic capacitors, etc., may be provided thereat, for example.

What is claimed is:

1. A light-emitting diode driver circuit comprising:

a first rectifier circuit configured to output a first rectified voltage obtained by rectifying an AC voltage;

a transformer including a primary coil provided on a primary side, a secondary coil provided on a secondary side, and an auxiliary coil inductively coupled to the primary coil or the secondary coil, the primary coil configured to be applied with the first rectified voltage;

a transistor connected in series to the primary coil to control a current passing through the primary coil;

a second rectifier circuit configured to output a second rectified voltage obtained by rectifying a voltage generated in the auxiliary coil;

a capacitor configured to be charged with the second rectified voltage; and a voltage-dividing circuit configured to divide a charging voltage of the capacitor; and a control circuit configured to control on and off of the transistor based on a divided voltage output from the voltage-dividing circuit so that the charging voltage becomes equal to a predetermined voltage, the secondary coil outputting a voltage that varies with a frequency corresponding to a frequency of the first rectified voltage and that corresponds to a turns ratio between the primary coil and the secondary coil, as a voltage for driving a light-emitting diode.

2. The light-emitting diode driver circuit of claim 1, wherein the first rectifier circuit includes a full-wave rectifier circuit.

3. The light-emitting diode driver circuit of claim 2, further comprising a current detecting circuit configured to output a detection voltage corresponding to a value of a current passing through the transistor, wherein the control circuit controls on and off of the transistor so that a value of a current passing through the transistor varies according to the first rectified voltage as well as the charging voltage becomes equal to a predetermined voltage, based on the charging voltage, the detection voltage, and the first rectified voltage.

4. The light-emitting diode driver circuit of claim 3, wherein the voltage-dividing circuit divides the charging voltage at a voltage division ratio according to a control signal; and the control circuit controls on and off of the transistor so that a value of a current passing through the transistor varies according to the first rectified voltage as well as the divided voltage becomes equal to a predetermined voltage, based on the divided voltage output from the voltage-dividing circuit, the detection voltage, and the first rectified voltage.

5. A lighting apparatus comprising:

a first rectifier circuit configured to output a first rectified voltage obtained by rectifying an AC voltage;

a transformer including a primary coil provided on a primary side, a secondary coil provided on a secondary side, and an auxiliary coil inductively coupled to the primary coil or the secondary coil, the primary coil configured to be applied with the first rectified voltage;

a transistor connected in series to the primary coil to control a current passing through the primary coil;

a second rectifier circuit configured to output a second rectified voltage obtained by rectifying a voltage generated in the auxiliary coil;

a capacitor configured to be charged with the second rectified voltage;

a voltage-dividing circuit configured to divide a charging voltage of the capacitor;

a control circuit configured to control on and off of the transistor based on a divided voltage output from the voltage-dividing circuit so that the charging voltage becomes equal to a predetermined voltage; and a light-emitting diode, the secondary coil outputting a voltage that varies with a frequency corresponding to a frequency of the first rectified voltage and that corresponds to a turns ratio between the primary coil and the secondary coil, as a voltage for driving the light-emitting diode.

* * * * *